US009563337B2

(12) United States Patent
Higuchi

(10) Patent No.: US 9,563,337 B2
(45) Date of Patent: Feb. 7, 2017

(54) INFORMATION PROCESSING DEVICE, METHOD FOR CONTROLLING AN INFORMATION PROCESSING DEVICE, AND PROGRAM

(75) Inventor: Kazutoshi Higuchi, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/978,440

(22) PCT Filed: Nov. 11, 2011

(86) PCT No.: PCT/JP2011/076080
§ 371 (c)(1),
(2), (4) Date: Jul. 5, 2013

(87) PCT Pub. No.: WO2012/127733
PCT Pub. Date: Sep. 27, 2012

(65) Prior Publication Data
US 2014/0009423 A1  Jan. 9, 2014

(30) Foreign Application Priority Data
Mar. 23, 2011 (JP) .................. 2011-064170

(51) Int. Cl.
*G06F 3/0484* (2013.01)
*G06F 3/0485* (2013.01)
*G06F 3/0488* (2013.01)

(52) U.S. Cl.
CPC .......... *G06F 3/0484* (2013.01); *G06F 3/0485* (2013.01); *G06F 3/04883* (2013.01); *G06F 3/04886* (2013.01)

(58) Field of Classification Search
None
See application file for complete search history.

(56) References Cited

U.S. PATENT DOCUMENTS 8,402,386 B2   3/2013  Hakiel et al.
2006/0262136 A1  11/2006  Vaisanen
(Continued)

FOREIGN PATENT DOCUMENTS

CN   1670680   9/2005
EP   1998245   12/2008
(Continued)

OTHER PUBLICATIONS

Extended European Search Report dated Jul. 28, 2014; Application No. 11861343.9.
(Continued)

*Primary Examiner* — Jason Olson
*Assistant Examiner* — Krishna Neupane
(74) *Attorney, Agent, or Firm* — Young & Thompson

(57) ABSTRACT

An information processing device includes: a display unit; a touch panel that is arranged overlapping the display unit, that detects contact by or proximity with an indication element, and that outputs detection results; and a control unit that displays all or a portion of an operation image on the display unit and, when a portion of the operation image is being displayed on the display unit and a drag operation is carried out that causes sliding of the contact point at which the indication element and touch panel are in proximity or contact, identifies the direction of movement and the amount of movement of the contact point that accompany the drag operation, and scrolls the display of the display unit by an amount that corresponds to the amount of movement that was identified and in the direction opposite to the direction of movement that was identified.

13 Claims, 11 Drawing Sheets

(56) References Cited

U.S. PATENT DOCUMENTS

| | | |
|---|---|---|
| 2006/0262146 A1 | 11/2006 | Koivisto et al. |
| 2006/0265653 A1 | 11/2006 | Paasonen et al. |
| 2007/0120832 A1 | 5/2007 | Saarinen et al. |
| 2008/0046496 A1 | 2/2008 | Kater |
| 2008/0284744 A1* | 11/2008 | Park .................... G06F 3/04886 345/173 |
| 2010/0134425 A1* | 6/2010 | Storrusten ............. G06F 3/0425 345/173 |
| 2011/0154196 A1* | 6/2011 | Icho ..................... G06F 3/0485 715/702 |
| 2011/0258565 A1* | 10/2011 | Arscott ................ G06F 3/0416 715/763 |
| 2013/0002561 A1* | 1/2013 | Wakasa .................. G06F 3/018 345/168 |

FOREIGN PATENT DOCUMENTS

| | | |
|---|---|---|
| EP | 2045700 | 4/2009 |
| EP | 2076000 | 7/2009 |
| EP | 2133778 | 12/2009 |
| JP | H09-319502 | 12/1997 |
| JP | 2003-330613 | 11/2003 |
| JP | 2007-026349 | 2/2007 |
| JP | 2008-542868 | 11/2008 |
| JP | 2008-305294 | 12/2008 |
| JP | 2010-049503 | 3/2010 |
| JP | 2010-108061 | 5/2010 |
| JP | 2010-204781 | 9/2010 |

OTHER PUBLICATIONS

International Search Report, PCT/JP2011/076080, Feb. 14, 2012.
JP Office Action, dated Jul. 28, 2015; Application No. 2013-505774.
Chinese Official Action—201180069201.1—Oct. 20, 2015.

\* cited by examiner

INFORMATION PROCESSING DEVICE, METHOD FOR CONTROLLING AN INFORMATION PROCESSING DEVICE, AND PROGRAM

BACKGROUND OF THE INVENTION

Technical Field

The present invention relates to an information processing device in which operation input is carried out by way of a touch panel, a method for controlling the information processing device, and a program.

Background Art

In recent years, information processing devices such as smartphones and portable game devices are frequently equipped with a display unit and a touch panel that are arranged overlapping the display unit that detects contact by an indication means such as a finger or a stylus pen, the operation input being carried out by way of the touch panel.

In an information processing device in which operation input is carried out by way of a touch panel, an operation image that includes operation buttons that indicate operation content is displayed on the display unit, and by placing the indication means in contact with an operation button, processing that corresponds to the operation content that is indicated by the operation button is carried out. Operation input by way of a touch panel not only allows the user to carry out operation input intuitively, thereby improving usability, but further allows the elimination of a physical key construction for operation input from the information processing device, thereby allowing an increase of the size of the display unit that corresponds to the eliminated key construction.

However, when the information processing device is a portable device such as a smartphone that can be carried by the user, since portability is important, the size of the display unit is limited to a size that can be accommodated in the palm of the user's hand. When an entire operation image is to be displayed under limitations that are imposed on the size of the display unit, the display of the operation buttons will be excessively reduced in size, and as a result, there is possibility that the selection of the operation buttons becomes difficult.

Patent Document 1 (JP2003-330613A) and Patent Document 2 (JP2010-204781A) disclose information processing devices in which the area of a portion of the operation image is displayed on the display unit, and when the indication means has been placed in contact with the touch panel and a drag operation is carried out in which the contact point is caused to slide, the display of the display unit is scrolled in accompaniment with the drag operation in the same direction as the direction of movement of the contact point and by an amount that corresponds to the amount of movement of the contact point. By means of these information processing devices, displaying only the area of a portion of the operation image on the display unit can prevent excessive reduction of the size of the display of the operation buttons, and further, when a target operation button is not displayed on the display unit, can realize display of the target operation button by scrolling the display of the display unit.

RELATED ART LITERATURE

Patent Documents

Patent Document 1: JP2003-330613A
Patent Document 2: JP2010-204781A

DISCLOSURE OF THE INVENTION

Nevertheless, in an information processing device in which the display of a display unit is scrolled in the same direction as the direction of movement of the contact point such as described in Patent Documents 1 and 2, the area displayed on the display unit is limited to the direction of scrolling, and the problem therefore arises that a target operation button becomes difficult to find.

An object of the present invention is to provide an information processing device, a control method of the information processing device, and a program which are capable of solving the problem described above by achieving a reduction in the time and effort that is required to perform an operation input.

SUMMARY OF THE INVENTION

To achieve the above described object, an information processing device according to the present invention includes:

a display unit;

a touch panel that is arranged overlapping the display unit, that detects proximity of or contact by an indication means, and that outputs the detection result; and a control unit that causes display of all or a portion of an operation image on the display unit and that, when a portion of the operation image is being displayed on the display unit and a drag operation is carried out in which the contact point at which an indication means and the touch panel are in proximity or contact is caused to slide, identifies the direction of movement and amount of movement of the contact point that accompany the drag operation and scrolls the display of the display unit by an amount that corresponds to the amount of movement that was identified and in the direction opposite to the direction of movement that was identified.

To achieve the above described object, a control method of an information processing device according to the present invention includes:

displaying all or a portion of an operation image on a display unit of the information processing device; and when a portion of the operation image is being displayed on the display unit and a drag operation is carried out that causes sliding of a contact point at which an indication means and a touch panel, which is arranged overlapping the display unit, and which detects contact by or proximity of the indication means, and which outputs detection results, come into proximity or contact, identifying the direction of movement and the amount of movement of the contact point that accompany the drag operation, and scrolling the display of the display unit by an amount that corresponds to the amount of movement that was identified and in the direction opposite to the direction of movement that was identified.

To achieve the above described object, a program according to the present invention causes an information processing device to execute processes of:

displaying all or a portion of an operation image on a display unit of the information processing device; and when a portion of the operation image is being displayed on the display unit and a drag operation is carried out that causes sliding of a contact point at which an indication means and a touch panel, which is arranged overlapping the display unit, which detects contact by or proximity of the indication means, and which outputs detection results, come into proximity or contact, identifying the direction of movement and the amount of movement of the contact point that accompany the drag operation, and scrolling the display of the display unit by an amount that corresponds to the amount of movement that was identified and in a direction opposite to the direction of movement that was identified.

According to the present invention, a reduction in the time and effort that is required to perform an operation input can be achieved.

EXEMPLARY EMBODIMENT

In the following, an exemplary embodiment for carrying out the present invention will be described with reference to the drawings.

First Exemplary Embodiment

Figure 1:
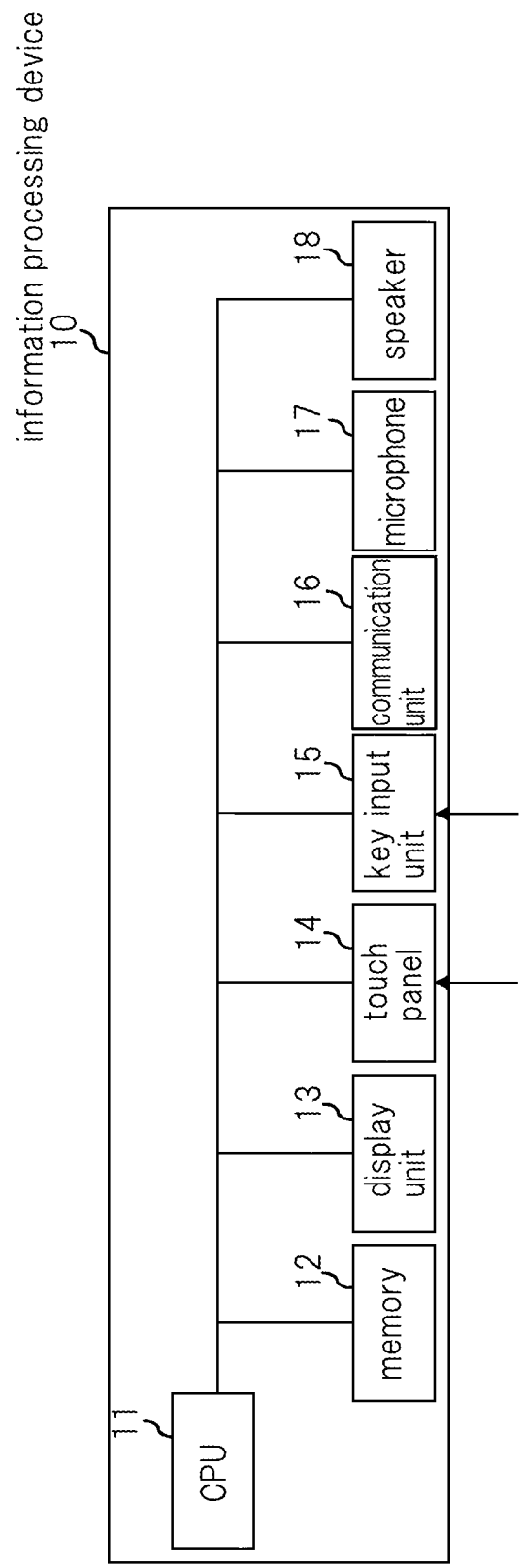
FIG. 1 is a block diagram showing the configuration of the information processing device of the first exemplary embodiment of the present invention.

FIG. 1 is a block diagram showing the configuration of the information processing device of the first exemplary embodiment of the present invention.

Information processing device 10 shown in FIG. 1 includes CPU (Central Processing Unit) 11, memory 12, display unit 13, touch panel 14, key input unit 15, communication unit 16, microphone 17, and speaker 18. Actual examples of information processing device 10 include smartphones, portable game devices, and notebook or tablet personal computers.

CPU 11 is one example of a control unit, is connected to each of the above-described components, and controls each component.

Memory 12 is composed of ROM (Read Only Memory) and RAM (Random Access Memory), stores fixed data and various types of control programs that are executed by CPU 11 in ROM, and stores data that are temporarily necessary when CPU 11 executes each of various control programs in RAM.

Display unit 13 displays various images such as operation images in accordance with the control of CPU 11.

Touch panel 14 is arranged overlapping the display surface of display unit 13, detects contact by an indication means such as a finger or a stylus pen, and outputs information that indicates the coordinates of a contact point as a detection result to CPU 11. Touch panel 14 is further capable of detecting the proximity of the indication means and, taking the point of proximity of the indication means as the contact point, outputting information that indicates the coordinates of the contact point.

When key input unit 15 is depressed in order to perform the operation input, key input unit 15 outputs information that indicates the depressing state to CPU 11.

Communication unit 16 communicates with, for example, other information processing devices via a network in accordance with the control of CPU 11.

Microphone 17 outputs speech data obtained by picking up surrounding sounds to CPU 11.

Speaker 18 outputs sound in accordance with the control of CPU 11.

A summary of the operations of information processing device 10 of the present exemplary embodiment is next described.

When an area of a portion of the operation image is being displayed and a target operation button in the operation image is to the left of the area that is being displayed on display unit 13, the display of display unit 13 must be scrolled to the right in order for the target operation button to be displayed.

As disclosed in Patent Documents 1 and 2, when the display of the display unit is scrolled in the same direction as the direction of movement of the contact point, a drag operation is carried out to slide the contact point to the right in order to scroll the display of the display unit to the right. With this drag operation, the display of the display unit is scrolled to the right and the target operation button is displayed from the left direction of display unit 13, but because the contact point is moving in the right direction, in order to select the target operation button, the indication means must be removed from the touch panel to cancel the drag operation and then the indication means must again be placed in contact with the touch panel to select the target operation button.

On the other hand, in information processing device 10 of the present exemplary embodiment, the display of display unit 13 is scrolled in the direction opposite to the direction of movement of the contact point. Accordingly, in order to scroll the display of display unit 13 in the rightward direction, a drag operation is carried out that slides the contact point toward the left. In accompaniment with this drag operation, the contact point moves toward the left, the display of display unit 13 is scrolled toward the right, and the target operation button is displayed from the left of display unit 13, whereby the target operation button is displayed approaching the contact point on display unit 13. Accordingly, the display area in the direction in which the display of display unit 13 is being scrolled is added to the currently displayed area in the direction in which the drag operation is being carried out, whereby the area that is displayed on display unit 13 in accompaniment with the drag operation is twice the display area in the prior art, the amount of movement of the contact point can be made less than that for a case in which the display of a display unit is scrolled in the same direction as the direction of movement of the contact point, and a reduction in the time and effort that is required to perform an operation input can be achieved.

In addition, in information processing device 10 of the present exemplary embodiment, display is realized on display unit 13 such that the target operation button approaches the contact point, whereby the contact point can be moved over the target operation button, and when the drag operation is cancelled with the contact point on the operation button, this operation button is processed as having been selected. Accordingly, scrolling of the display of display unit 13 and selection of an operation button can be realized in one drag operation and a reduction in the time and effort that is required to perform an operation input thereby can be achieved.

Figure 2:
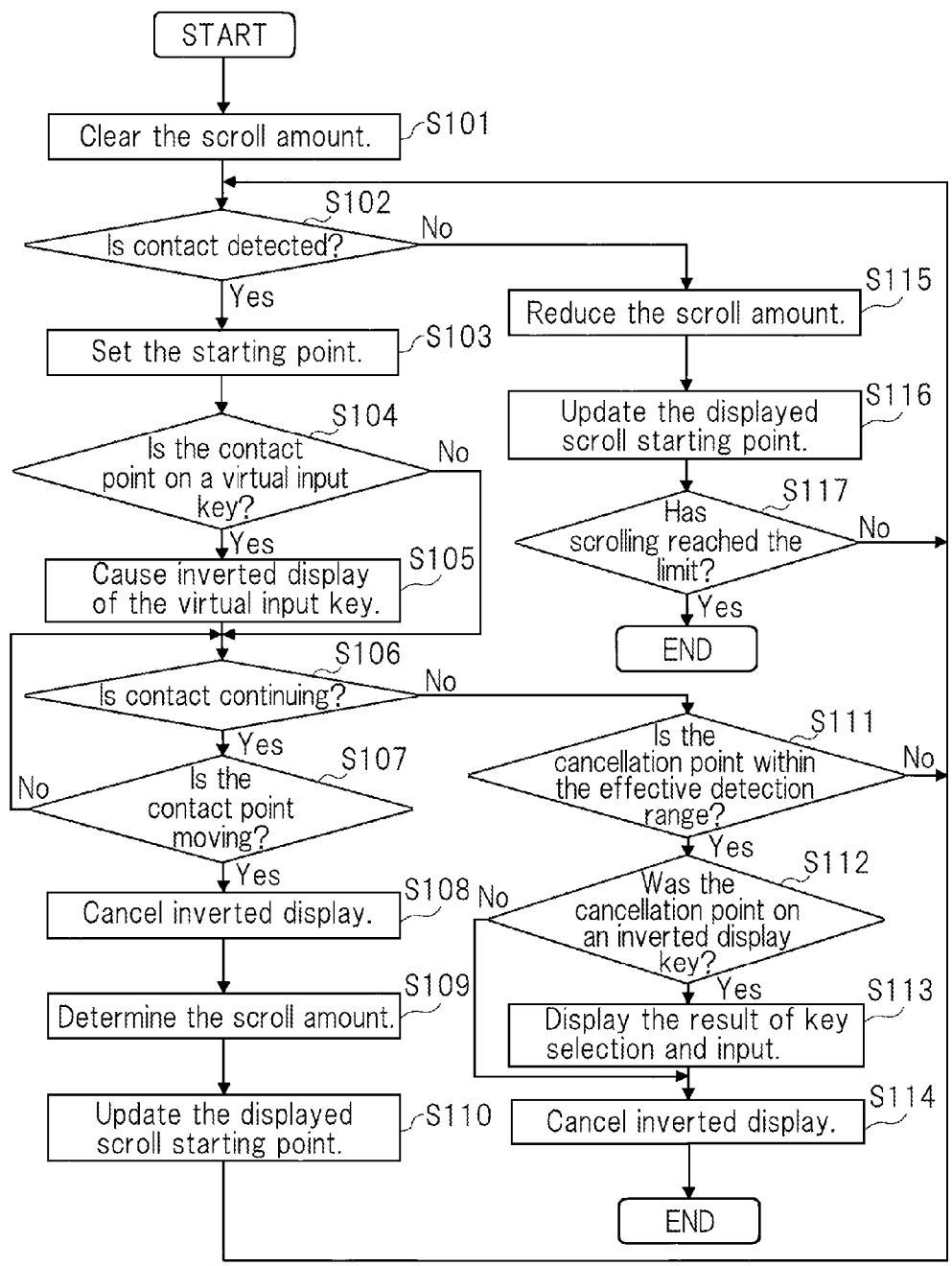
FIG. 2 is a flow chart showing the operation of the information processing device shown in FIG. 1.

The actual operations of information processing device 10 of the present exemplary embodiment are next described with reference to the flow chart shown in FIG. 2.

In the following explanation, a case is described in which a virtual keyboard that includes virtual input keys that correspond to, for example, characters or symbols is displayed on display unit 13, and in which character input is carried out by using a character input application in which character input is carried out by using indication means 20 to select virtual character input keys.

When input that is performed by way of touch panel 14 indicates that the character input application is to be activated, CPU 11 clears the scroll amount of the display of display unit 13 that is stored in memory 12 (Step S101).

CPU 11 next causes the virtual keyboard to be displayed on display unit 13.

Figure 3:
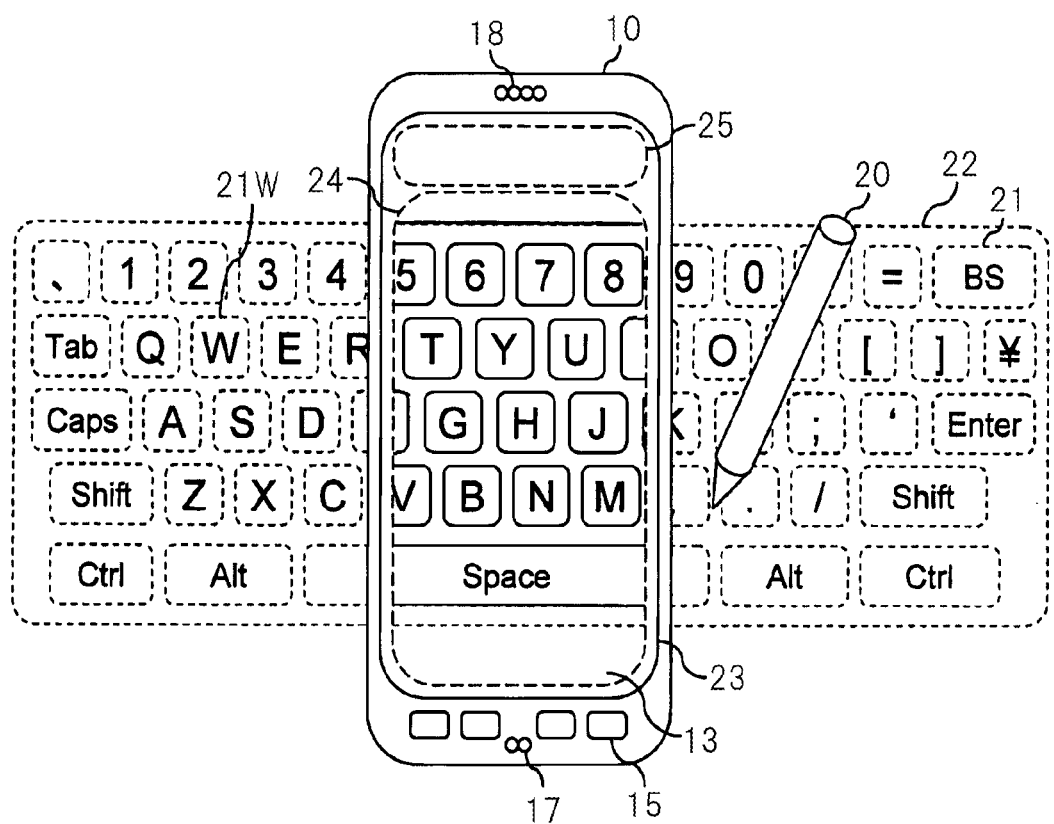
FIG. 3 shows an example of the display of the display unit shown in FIG. 1.

FIG. 3 shows the state in which virtual keyboard 22 that includes virtual keys 21 is displayed on display unit 13.

As shown in FIG. 3, CPU 11 sets selection item display range 24 and selection result display range 25 on the display surface of display unit 13 that is within effective detection range 23 in which touch panel 14 detects contact by indication means 20, causes display of a portion of virtual keyboard 22 in selection item display range 24, and causes display of characters that correspond to the virtual input keys that are selected in selection result display range 25. In the following explanation, although the area on virtual keyboard 22 that is displayed in selection item display range 24 is shown by solid lines and the area outside the area that is displayed in selection item display range 24 is shown by dotted lines, this method of illustration is in the interest of facilitating understanding and of course does not represent the actual state.

A case is next described in which, from the state shown in FIG. 3, the input of the four characters "well" is carried out by way of example.

The input of the character "w" is first described.

Figure 4:
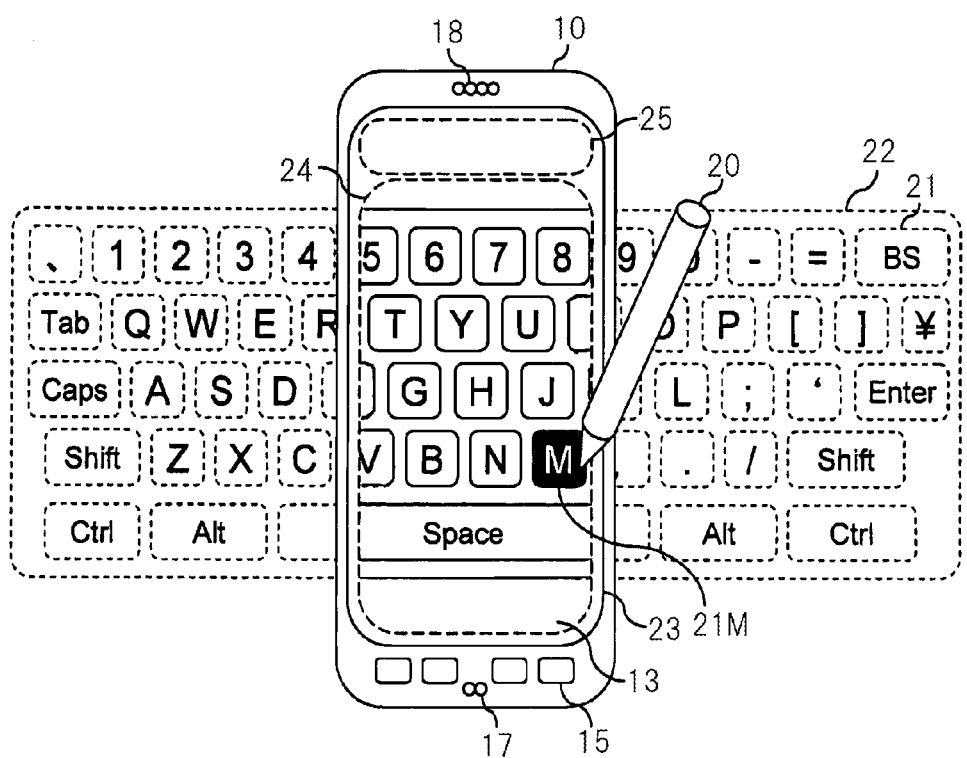
FIG. 4 shows an example of the transition of the display of the display unit shown in FIG. 1.

In order to carry out the input of the character "w", virtual input key 21 that corresponds to the character "w" (hereinbelow referred to as "virtual input key 21 W") must be displayed on display unit 13. In FIG. 3, virtual input key 21 W is not displayed on display unit 13, and the user therefore places indication means 20 in contact with touch panel 14 to carry out a drag operation and scroll the display of display unit 13. It is assumed hereinbelow that, as shown in FIG. 4, the contact of indication means 20 is carried out on virtual input key 21 that corresponds to the character "m" (hereinbelow referred to as "virtual input key 21 M").

CPU 11 judges whether or not contact of indication means 20 has been carried out or not based on output from touch panel 14 (Step S102).

As previously described, contact of indication means 20 has been carried out, and touch panel 14 therefore outputs information that indicates the coordinates of the contact point to CPU 11.

Upon judging that contact to touch panel 14 by indication means 20 has been carried out based on the output from touch panel 14 (YES in Step S102), CPU 11 sets the coordinates of the contact point as the starting point for identifying the direction of movement and the amount of movement of the contact point that accompany the drag operation and stores this information in memory 12 (Step S103).

CPU 11 next judges whether or not the contact point is on virtual input key 21 that is displayed in display unit 13 depending on whether or not the coordinates of the contact point are within the area in which virtual input key 21 is displayed (Step S104).

If the contact point is not on virtual input key 21 (NO in Step S104), CPU 11 proceeds to the process of Step S106, to be described later.

If the contact point is on virtual input key 21 (YES in Step S104), CPU 11 causes display of this virtual input key 21 on display unit 13 (Step S105) to be emphasized.

As described hereinabove, the contact of indication means 20 has been carried out on virtual input key 21 M, and the coordinates of the contact point are therefore within the area in which virtual input key 21 M is displayed. As shown in FIG. 4, CPU 11 causes inverted display of virtual input key 21 M on display unit 13 as an input candidate. In the present exemplary embodiment, the explanation uses an example in which inverted display of virtual input key 21 that is an input candidate is used as one example of an emphasized display, but the present invention is not limited to this example, and, for example, enlarged display of input candidate virtual input key 21 or bold display of the character on virtual input key 21 may also be employed.

In FIG. 4, virtual input key 21 W is to the left of the area on virtual keyboard 22 that is being displayed on display unit 13, and the user therefore carries out a drag operation to move the contact point toward the left to scroll the display of display unit 13 toward the right.

Again referring to FIG. 2, CPU 11 judges whether or not the contact between indication means 20 and touch panel 14 is continuing (Step S106).

As described hereinabove, the user is carrying out a drag operation, and the contact between indication means 20 and touch panel 14 is therefore continuing.

When the contact to touch panel 14 is continuing (YES in Step S106), CPU 11 judges whether or not the contact point is moving from the starting point (Step S107).

If the contact point is not moving (NO in Step S107), CPU 11 returns to the process of Step S106.

If the contact point is moving (YES in Step S107), CPU 11 cancels the inverted display of virtual input key 21 on display unit 13 (Step S108).

CPU 11 next identifies the direction of movement and amount of movement of the contact point from the starting point and determines the amount of scrolling of the display of display unit 13 according to the direction of movement and amount of movement that were identified (Step S109) and stores this information in memory 12.

Figure 5:
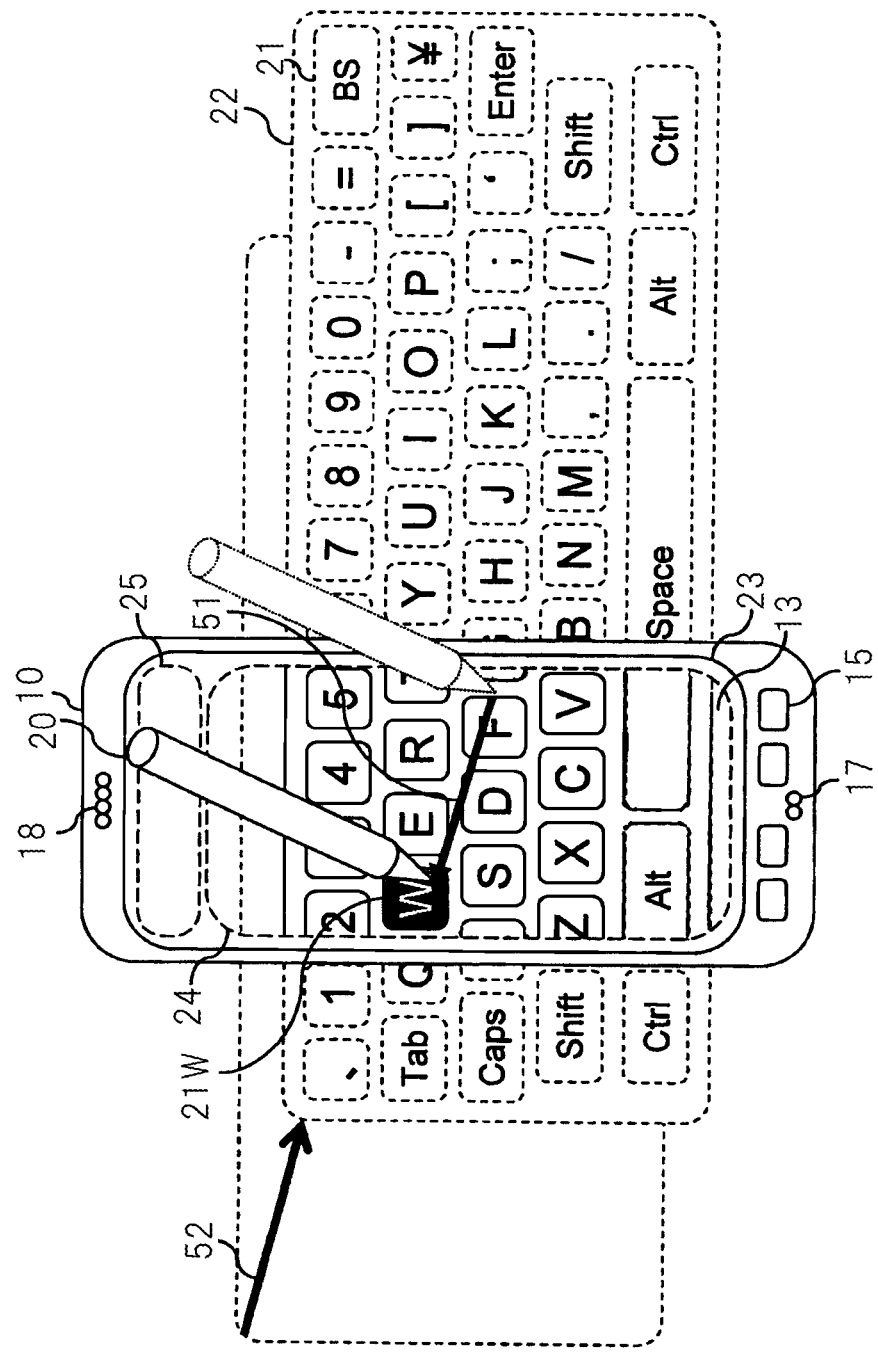
FIG. 5 shows another example of the transition of the display of the display unit shown in FIG. 1.

CPU 11 next stores in memory 12, as the new starting point a point, that is moved by the identified amount of movement in the identified direction of movement from the starting point that was stored in memory 12 in Step S103 and causes the display of display unit 13 to scroll by the determined scroll amount (Step S110). Here, CPU 11 causes the display of display unit 13 to scroll in the direction that is opposite to the direction of movement of the contact point by an amount that is equal to the amount of movement of the contact point. Accordingly, when the movement of the contact point that is shown on movement vector 51 of FIG. 5 is carried out, an image is displayed in selection item display range 24 in which virtual keyboard 22 is moved by the amount of display scroll vector 52 that is the same size as the vector of movement vector 51 but in the opposite direction. Accordingly, the area of the operation image that is displayed on display unit 13 is greater based upon less amount of movement of the contact point than for a case in which the display of the display unit is scrolled in the same direction as the direction of movement of the contact point, and a reduction in the time and effort that is required to perform an operation input can therefore be achieved.

The size of display scroll vector 52 may be made greater than or smaller than the size of movement vector 51. In addition, the size of display scroll vector 52 may be made the same as the size of movement vector 51 when the speed of movement of the contact point is less than a predetermined threshold value and may be made greater than the size of movement vector 51 when the speed of movement of the contact point is equal to or greater than the predetermined threshold value.

CPU 11 returns to the process of Step S102 after the process of Step S110 has been carried out. CPU 11 repeats the inverted display of virtual input keys and repeats the cancelling of this inverted display according to the movement of the contact point that accompanies the drag operation by repeating the processes from Step S102 up to Step S110 in, for example, a predetermined time interval.

It is assumed that, when the contact point is on virtual input key 21 W, the user has removed indication means 20 from the touch panel, and has cancelled the drag operation.

Because the touch point is on virtual input key 21 W, CPU 11 causes inverted display of virtual input key 21 W (Step S105), and then, because indication means 20 is removed from touch panel 14 (NO in Step S106), CPU 11 judges whether the cancellation point at which indication means 20 was removed from touch panel 14 is within effective detection range 23 (Step S111).

If the cancellation point is within effective detection range 23 (YES in Step S111), CPU 11 judges whether or not the cancellation point is on virtual input key 21 that is displayed inverted (Step S112).

Figure 6:
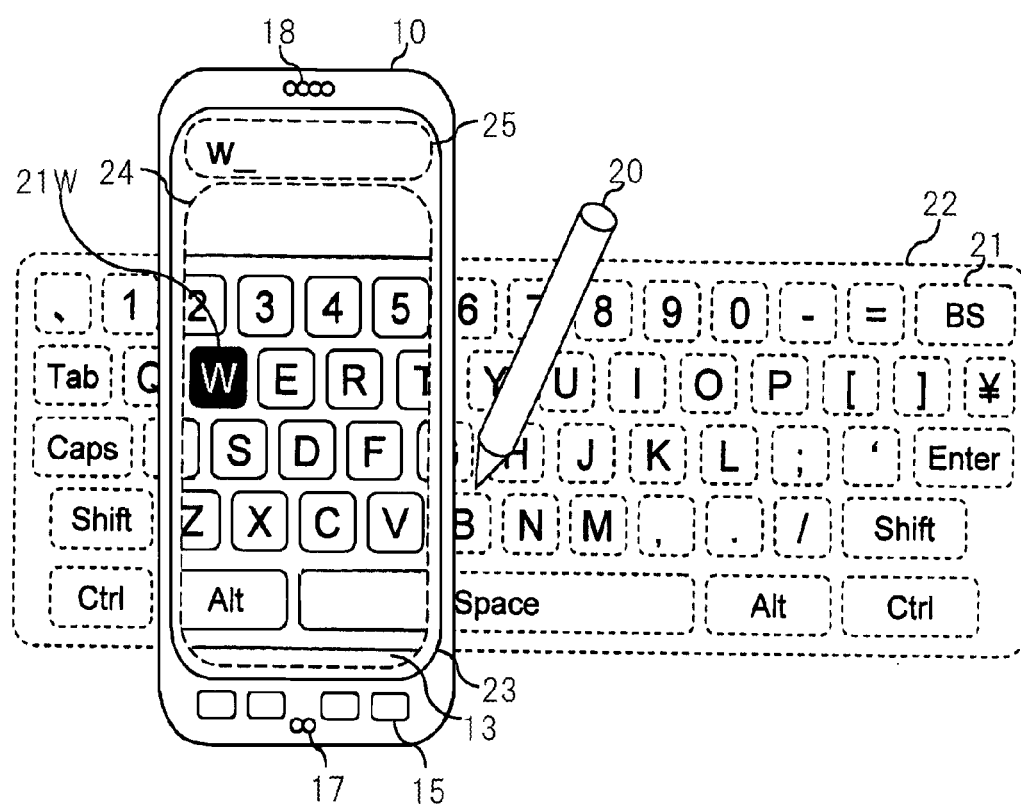
FIG. 6 shows another example of the transition of the display of the display unit shown in FIG. 1.

If the cancellation point is on virtual input key 21 that is being displayed inverted (YES in Step S112), CPU 11 assumes that this virtual input key 21 was selected and causes the character that corresponds to this virtual input key 21 to be displayed in selection result display range 25 (Step S113). As described hereinabove, inverted display of virtual input key 21 W was carried out and indication means 20 was removed from the contact point on virtual input key 21 W, and character "w" is therefore displayed in selection result display range 25 as shown in FIG. 6.

CPU 11 next cancels the inverted display of virtual input key 21 on display unit 13 (Step S114) and then completes the input process of one character.

If the cancellation point is not on virtual input key 21 that is being displayed inverted (NO in Step S112), it is highly likely that a drag operation was carried out that was different from the user's intentions, such as a cancellation at a position separated from the target virtual input key 21, and CPU 11 therefore proceeds to the process of Step S114 on the assumption that no virtual input key 21 was selected.

The input of character "e" is next described.

Figure 7:
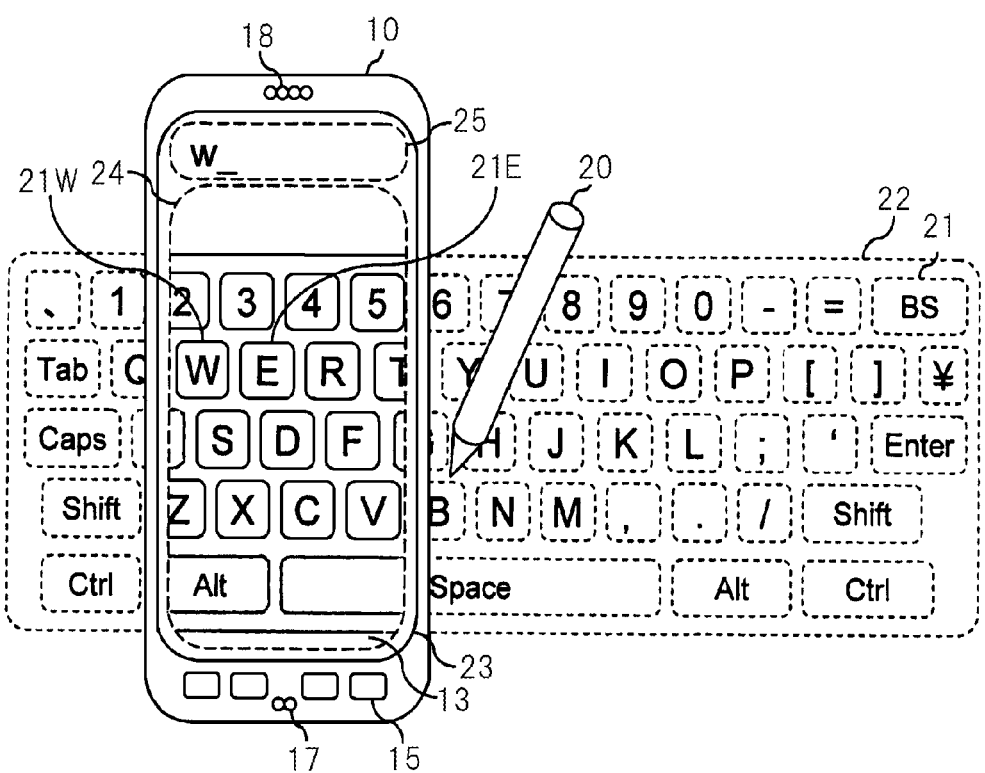
FIG. 7 shows another example of the transition of the display of the display unit shown in FIG. 1.

At the time of completion of the input of character "w", virtual input key 21 that corresponds to character "e" (hereinbelow referred to as "virtual input key 21 E") is displayed in selection item display range 24, as shown in FIG. 7. When the user places indication means 20 to make contact with virtual input key 21 E and then simply cancels contact, CPU 11 carries out the processes of Steps S101-S106 and S111-S114 and causes the display of character "e" in selection result display range 25 of display unit 13.

More specifically, CPU 11 detects contact by indication means 20 to touch panel 14 (YES in Step S102), and upon judging that the contact point is on virtual input key 21 E (YES in Step S104), causes inverted display of virtual input key 21 E (Step S105). When indication means 20 is removed (NO in Step S106), the cancellation point is on virtual input key 21 E, and CPU 11 therefore causes display of character "e" in selection result display range 25 of display unit 13 (Step S113) and cancels the inverted display of virtual input key 21 E (Step S114).

The input of the third character "l" is next described.

Figure 8:
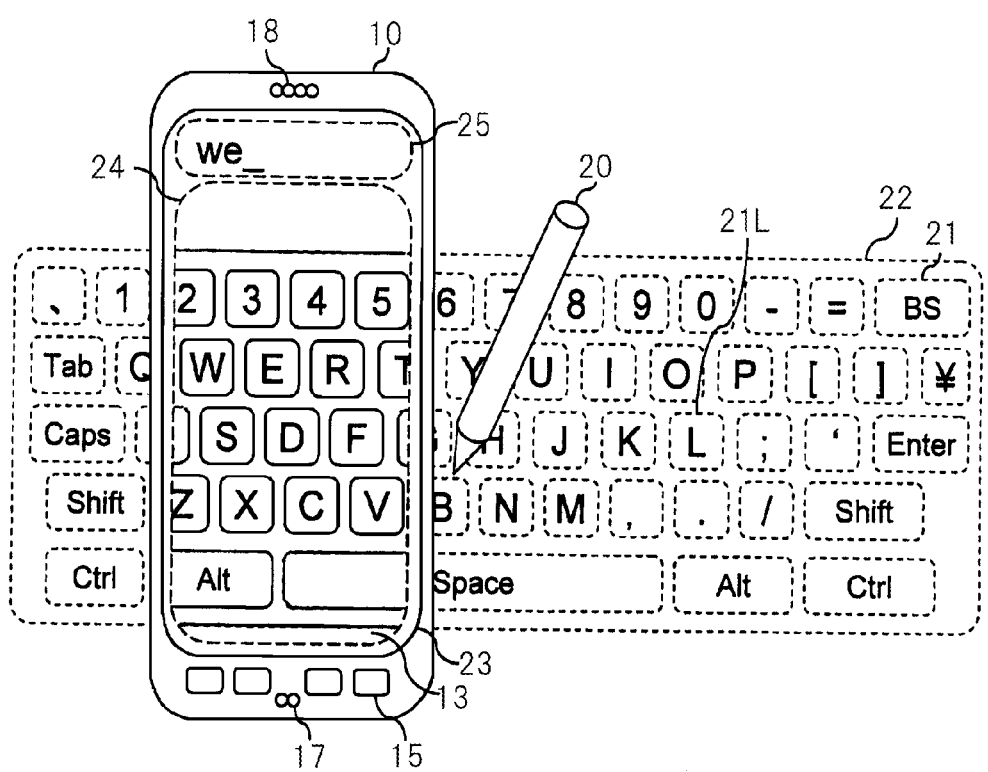
FIG. 8 shows another example of the transition of the display of the display unit shown in FIG. 1.

As shown in FIG. 8, at the time of completion of the input of character "e", virtual input key 21 that corresponds to character "l" (hereinbelow referred to as "virtual input key 21 L") is not being displayed in selection item display range 24, and the user therefore carries out a drag operation toward virtual input key 21 L to cause display of virtual input key 21 L in selection item display range 24.

It is here assumed that, even though the contact point is being caused to slide toward virtual input key 21 L in effective detection range 23, virtual input key 21 L cannot be displayed in selection item display range 24 by the scrolling of the display of display unit 13 that corresponds to the amount of movement of this contact point. In this case, the user keeps indication means 20 in contact with touch panel 14 beyond effective detection range 23.

When the contact point is beyond effective detection range 23, output from touch panel 14 comes to an end at the time that the contact point reaches the outer periphery of effective detection range 23, and CPU 11 therefore judges that contact by indication means 20 with touch panel 14 is not continuing in Step S106 and proceeds to the process of Step S111. In the process of Step S111, CPU 11 assumes that the point at which the contact point reached the outer periphery of effective detection range 23 was a cancellation point and judges whether the cancellation point is in effective detection range 23 of touch panel 14.

Because the contact point has reached the outer periphery of effective detection range 23, CPU 11 judges that the cancellation point is not in effective detection range 23 (NO in Step S111). In this case, CPU 11 returns to the process of Step S102 and waits for recovery of the contact point in effective detection range 23.

Figure 9:
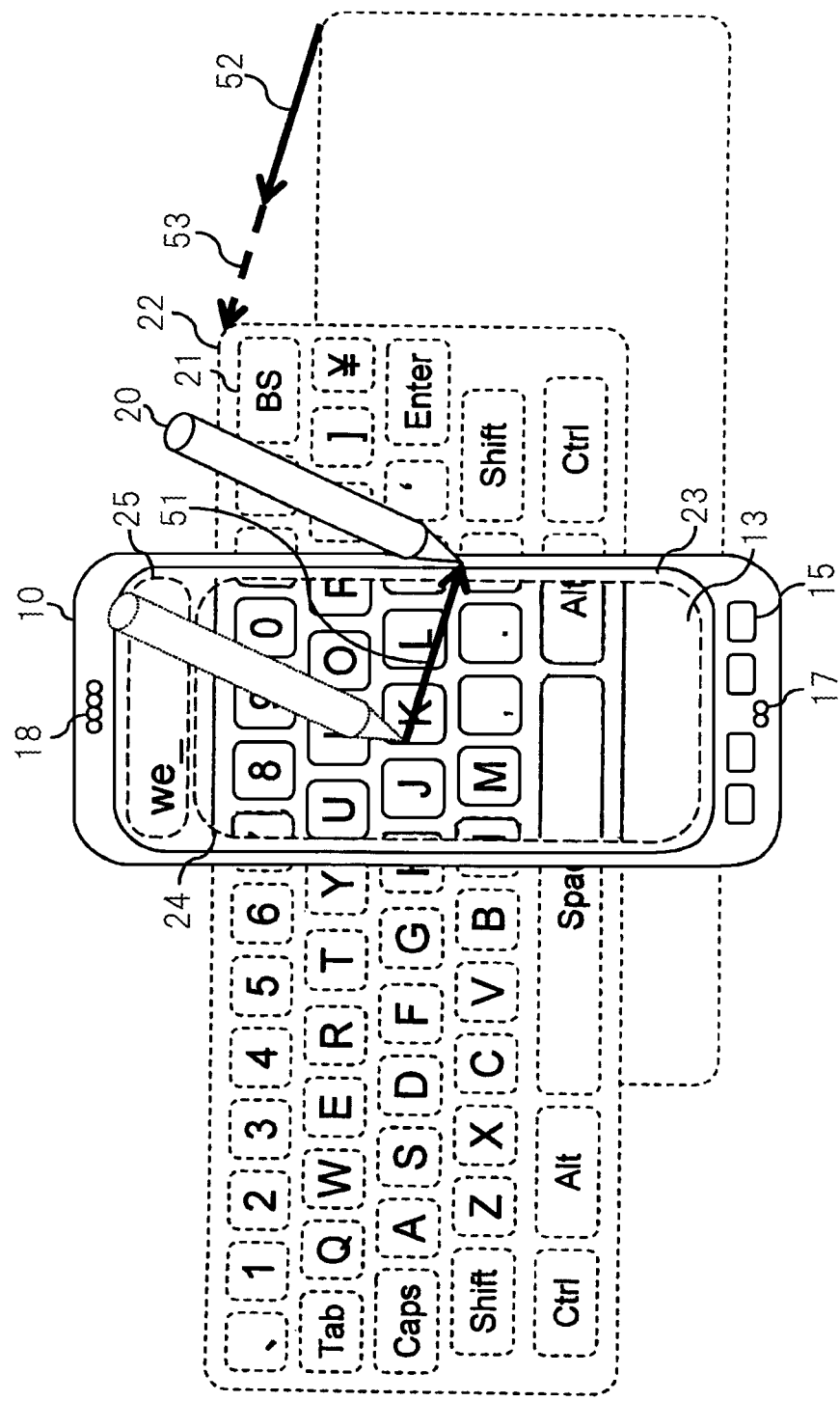
FIG. 9 shows another example of the transition of the display of the display unit shown in FIG. 1.

If contact with touch panel 14 is not carried out (NO in Step S102), CPU 11 reduces the amount of scrolling that is stored in memory 12 (Step S115). CPU 11 further causes scrolling of the display of display unit 13 by the amount of scrolling that follows reduction and updates the starting point that is stored in memory 12 to the coordinates of the point reached by movement of the scrolling amount after reduction from the starting point (Step S116). Accordingly, when the contact point of indication means 20 with touch panel 14 has reached the outer periphery of effective detection range 23 in accompaniment with the drag operation, the display of display unit 13 is scrolled by the size of vector 53 in which the direction is equal to that of display scroll vector 52 in addition to display scroll vector 52 in which the vector size is equal to that of movement vector 51 of the contact point but in which the direction is opposite, as shown in FIG. 9. The size of vector 53 is the size that corresponds to the amount of scrolling following reduction that was stored in memory 12 in Step S115.

CPU 11 next judges whether or not virtual keyboard 22 has passed selection item display range 24 of display unit 13 (Step S117).

If virtual keyboard 22 has not passed selection item display range 24 of display unit 13 (YES in Step S118), CPU 11 returns to the process of Step S102.

If virtual keyboard 22 has passed selection item display range 24 of display unit (NO in Step S117), CPU 11 judges that scrolling of the display of display unit 13 has reached the limit and ends the process.

When contact by indication means 20 with touch panel 14 is being carried out (YES in Step S102), CPU 11 returns to the process of Step S103.

Figure 10:
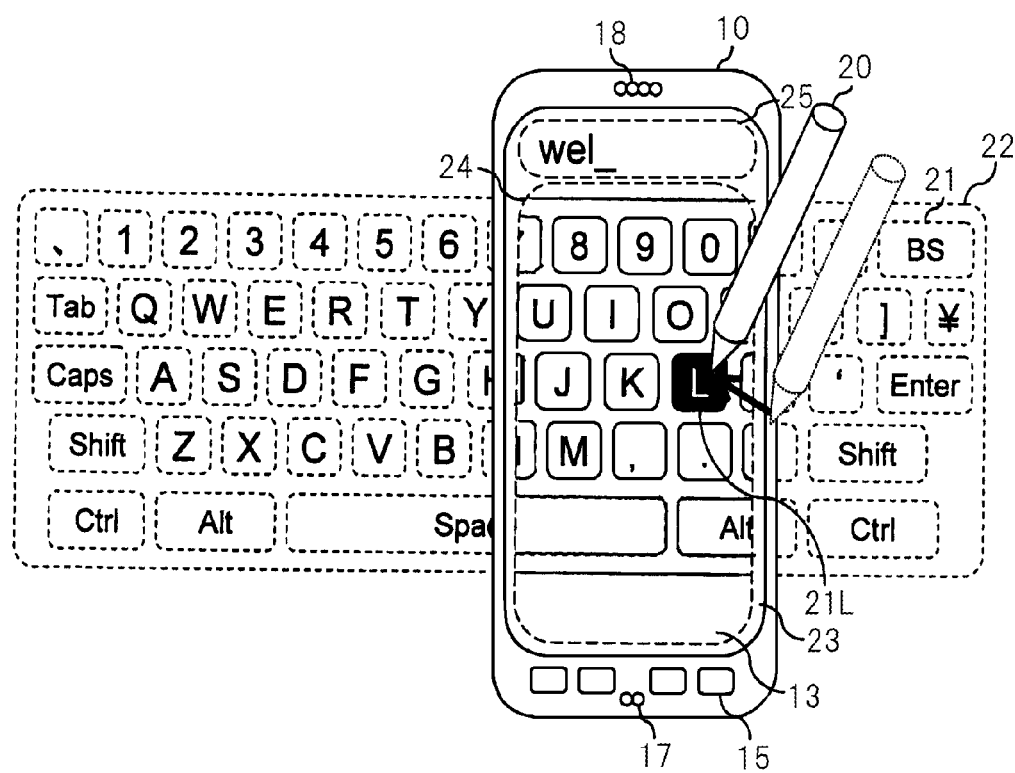
FIG. 10 shows another example of the transition of the display of the display unit shown in FIG. 1.

Accordingly, scrolling of the display of display unit 13 continues until contact with touch panel 14 is next carried out, and the user therefore waits for virtual input key 21 L to be displayed in selection item display range 24 to return the contact point of indication means 20 with touch panel 14 within effective detection range 23 as shown in FIG. 10, and when the user removes indication means 20 from touch panel 14 with the contact point on virtual input key 21 L, input of the character "l" is realized.

Figure 11:
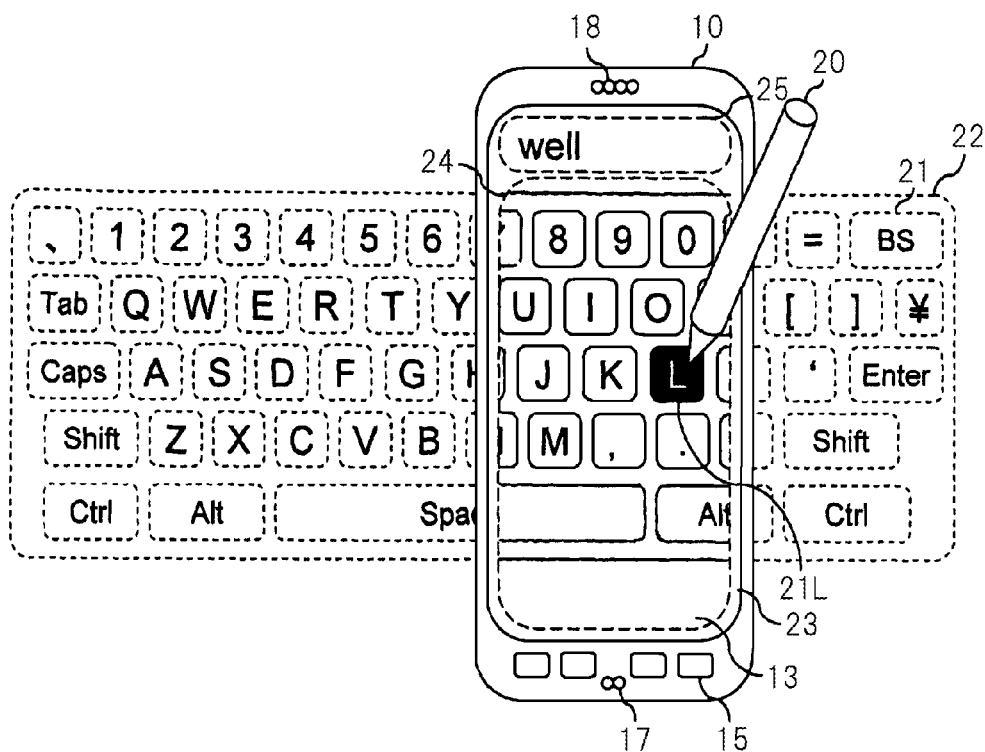
FIG. 11 shows another example of the transition of the display of the display unit shown in FIG. 1.

The fourth character "l" is entered as input when indication means 20 is placed in contact on virtual input key 21 L and then removed from touch panel 14 as shown in FIG. 11. The input procedure of the fourth character "l" is similar to the input procedure of character "e" and explanation is therefore here omitted.

Thus, according to the present exemplary embodiment, when a drag operation is carried out, information processing device 10 causes scrolling of the display of display unit 13 in the direction opposite to the direction of movement of the contact point that accompanies the drag operation.

As a result, a target operation button can be more easily found based upon the amount that the contact point moves in fewer drag operations, and a reduction in the time and effort that is required to perform an operation input can therefore be achieved.

In addition, according to the present exemplary embodiment, when the cancellation point of a drag operation is on an operation button, information processing device 10 takes this operation button as being selected and carries out processing in accordance with the content of the operation that was indicated by the operation button.

As a result, the scrolling of the display of display unit 13 and the selection of an operation button can be carried out by a single drag operation to achieve a reduction in time and effort that is required to perform an operation input.

According to the present exemplary embodiment, when the contact point is on an operation button, information processing device 10 causes the display of the operation button to be emphasized.

As a result, the user can more easily recognize an operation button that has become a selection candidate.

According to the present exemplary embodiment, information processing device 10 displays an operation image inside effective detection range 23, and when the contact point reaches the outer periphery of effective detection range 23 with a drag operation, identifies the direction of movement and the amount of movement of the contact point that accompany the drag operation and causes scrolling of the display of display unit 13 in the direction opposite to the direction of movement that was identified until the contact point is again detected within the effective detection range.

Normally, when the contact point exceeds effective detection range 23 of touch panel 14 in accompaniment with a drag operation, the drag operation must be first terminated and a new drag operation then started. However, when the contact point reaches the outer periphery of effective detection range 23 with a drag operation, scrolling of the display of display unit 13 until the contact point is again detected within effective detection range 23, as in the present exemplary embodiment, enables achieving a reduction in the time and effort that is required to perform an operation input.

Second Exemplary Embodiment

Figure 12:
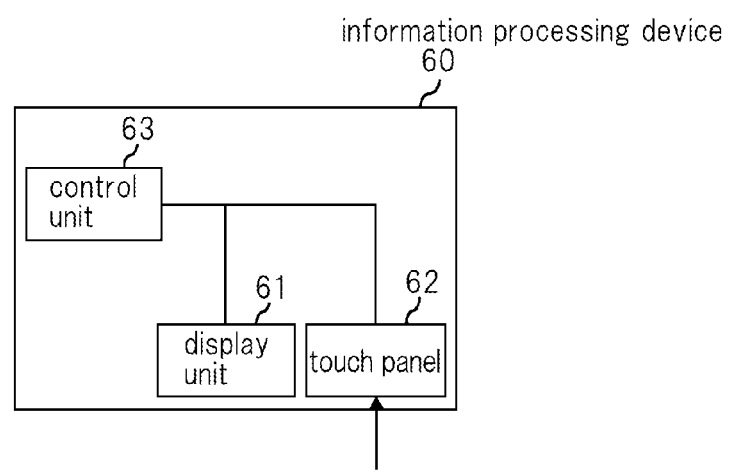
FIG. 12 is a block diagram showing the configuration of the information processing device of the second exemplary embodiment of the present invention.

FIG. 12 is a block diagram showing the configuration of the information processing device of the second exemplary embodiment of the present invention.

Information processing device 60 shown in FIG. 12 includes display unit 61, touch panel 62, and control unit 63.

Display unit 61 displays a variety of images such as operation images.

Touch panel 62 that is arranged overlapping display unit 61, detects contact by or proximity of indication means 20, and outputs detection results.

Control unit 63 causes display of all or a portion of an operation image on display unit 61. In addition, when a portion of an operation image is displayed on display unit 61 and a drag operation is carried out, control unit 63 identifies the direction of movement and the amount of movement of the contact point that accompany the drag operation. Control unit 63 further causes scrolling of the display of the display unit by an amount that corresponds to the amount of movement that was identified in a direction opposite to the direction of movement that was identified.

Thus, according to the present exemplary embodiment, information processing device 60 scrolls the display of display unit 61 in the direction opposite to the direction of movement of the contact point.

As a result, a target operation button is more easily found by the amount of movement of the contact point in fewer drag operations and a reduction in the time and effort that is required to perform an operation input can be achieved.

The method that is carried out in the information processing device of the present invention may also be applied to a program that causes a computer to carry it out. This program can further be stored to a memory medium and can also be provided to the outside by way of a network.

Although the invention of the present application has been described hereinabove with reference to exemplary embodiments, the present invention is not limited to the above-described exemplary embodiments. The configuration and details of the invention of the present application are open to various modifications within the scope of the invention of the present application that will be understood by one of ordinary skill in the art.

This application claims the benefits of priority based on Japanese Patent Application No. 2011-064170 for which application was submitted on Mar. 23, 2011 and incorporates by citation all of the disclosures of that application.

What is claimed is:

1. An information processing device comprising:
   a display unit;
   a touch panel that is arranged overlapping said display unit, that detects proximity of or contact by an indication means, and outputs detection results; and
   a control unit that causes display of all or a portion of an operation image on said display unit and that, when a portion of said operation image is being displayed on said display unit and when a drag operation is carried out, in which a contact point at which said indication means and said touch panel are in proximity or contact, is caused to slide, identifies a direction of movement and an amount of movement of said contact point that accompany said drag operation and scrolls a display of said display unit by an amount that is equal to said amount of movement that was identified and in a direction opposite to said direction of movement that was identified, wherein when the contact point at a time of completing said drag operation is on an operation button that is part of a virtual display or keyboard included in said operation image and that indicates a content of an operation, upon removal of the indication means from the touch panel said control unit carries out a process that corresponds to the content of the operation that was indicated by the operation button, and when the contact point of indication means with touch panel has reached an outer periphery of effective detection range in accompaniment with the drag operation, the display of the display unit is scrolled by a size vector in which the direction is equal to that of a display scroll vector in addition to the display scroll vector having a vector size that is equal to that of a movement vector of the contact point but in which the direction is opposite.

2. The information processing device according to claim 1, wherein, when said contact point is on the operation button that is included in said operation image and that indicates the content of the operation, said control unit causes display of said operation button on said display unit to be emphasized.

3. The information processing device according to claim 2, wherein, when said contact point in accompaniment with said drag operation reaches an outer periphery of an effective detection range in which said touch panel detects contact by or proximity of said indication means, said control unit identifies the direction of movement and amount of movement of said contact point that accompany said drag operation and scrolls the display of said display unit in the direction opposite to said direction of movement that was identified until said contact point is again detected within said effective detection range.

4. The information processing device according to claim 1, wherein, when said contact point in accompaniment with said drag operation reaches an outer periphery of an effective detection range in which said touch panel detects contact by or proximity of said indication means, said control unit identifies the direction of movement and the amount of movement of said contact point that accompany said drag operation and scrolls the display of said display unit in the direction opposite to said direction of movement that was identified until said contact point is again detected within said effective detection range.

5. The information processing device according to claim 1, wherein the size of the size vector is the size that corresponds to the amount of scrolling following reduction that was stored in memory.

6. A control method of an information processing device comprising:
 displaying all or a portion of an operation image on a display unit of said information processing device; and
 when a portion of said operation image is being displayed on said display unit and a drag operation is carried out that causes sliding of a contact point at which an indication means and a touch panel, which is arranged overlapping said display unit, and which detects contact by or proximity of said indication means, and which outputs detection results, come into proximity or contact, identifying a direction of movement and an amount of movement of said contact point that accompany said drag operation, and scrolling a display of said display unit by an amount that is equal to said amount of movement that was identified and in a direction opposite to said direction of movement that was identified, wherein when the contact point at a time of completing said drag operation is on an operation button that is part of a virtual display or keyboard included in said operation image and that indicates a content of an operation, upon removal of the indication means from the touch panel a process is carried out that corresponds to the content of the operation that is indicated by the operation button, and when the contact point of indication means with touch panel has reached an outer periphery of effective detection range in accompaniment with the drag operation, the display of the display unit is scrolled by a size vector in which the direction is equal to that of a display scroll vector in addition to the display scroll vector having a vector size that is equal to that of a movement vector of the contact point but in which the direction is opposite.

7. The control method of an information processing device according to claim 6, wherein, when said contact point is on the operation button that is included in said operation image and that indicates the content of the operation, display of the operation button on said display unit is caused to be emphasized.

8. The control method of an information processing device according to claim 7, wherein when said contact point in accompaniment with said drag operation reaches an outer periphery of an effective detection range in which said touch panel detects contact by or proximity of said indication means, the direction of movement and the amount of movement of said contact point that accompany said drag operation is identified, and the display of said display unit is scrolled in the direction opposite to said direction of movement that was identified until said contact point is again detected in said effective detection range.

9. The control method of an information processing device according to claim 6, wherein when said contact point in accompaniment with said drag operation reaches an outer periphery of an effective detection range in which said touch panel detects contact by or proximity of said indication means, the direction of movement and the amount of movement of said contact point that accompany said drag operation is identified, and the display of said display unit is scrolled in the direction opposite to said direction of movement that was identified until said contact point is again detected in said effective detection range.

10. The control method of an information processing device according to claim 6, wherein the size of the size vector is the size that corresponds to the amount of scrolling following reduction that was stored in memory.

11. A non-transient computer-readable recording medium configured to store a program, the program causing a computer in an information processing device to execute processes of:
 displaying all or a portion of an operation image on a display unit of said information processing device; and
 when a portion of said operation image is being displayed on said display unit and a drag operation is carried out that causes sliding of a contact point at which an indication means and a touch panel, which is arranged overlapping said display unit, and which detects contact by or proximity of an indication means, and which outputs detection results, come into proximity or contact, identifying a direction of movement and an amount of movement of said contact point that accompany said drag operation, and scrolling a display on said display unit by an amount that is equal to said amount of movement that was identified and in a direction opposite to said direction of movement that was identified, wherein when the contact point at a time of completing said drag operation is on an operation button that is part of a virtual display or keyboard included in said operation image and that indicates a content of an operation, upon removal of the indication means from the touch panel a process is carried out that corresponds to the content of the operation that is indicated by the operation button, and when the contact point of indication means with touch panel has reached an outer periphery of effective detection range in accompaniment with the drag operation, the display of the display unit is scrolled by a size vector in which the direction is equal to that of a display scroll vector in addition to the display scroll vector having a vector size that is equal to that of a movement vector of the contact point but in which the direction is opposite.

12. The information processing device according to claim 11, wherein, when said contact point is on the operation button that is included in said operation image and that indicates content of the operation, said control unit causes display of said operation button on said display unit to be emphasized.

13. The non-transient computer-readable recording medium configured to store a program according to claim 11, wherein the size of the size vector is the size that corresponds to the amount of scrolling following reduction that was stored in memory.

* * * * *